Sept. 5, 1967  R. KARL  3,339,976
AUTOMOBILE SEAT BACKREST LOCKING DEVICE
Filed May 12, 1966
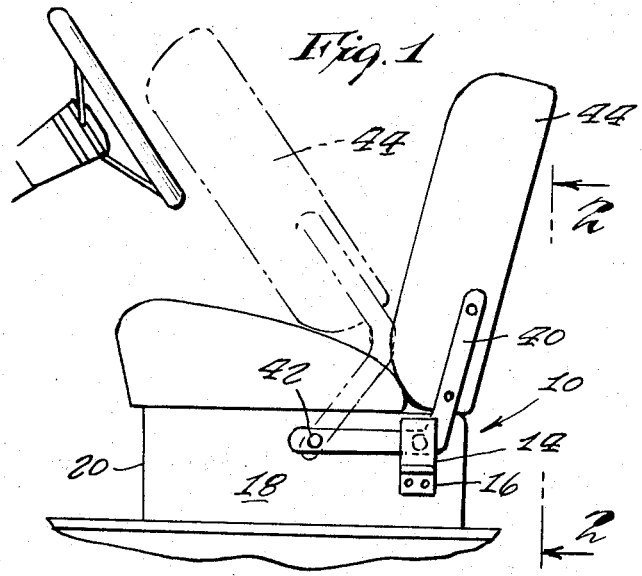
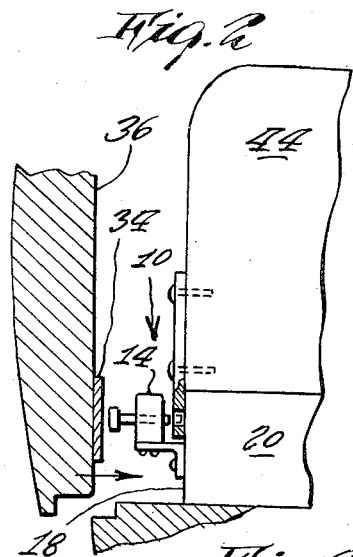
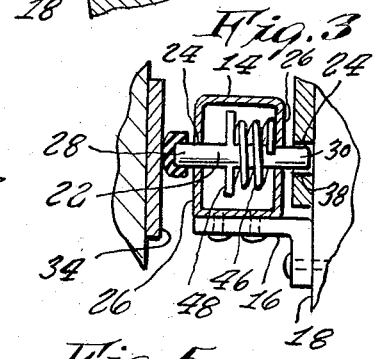
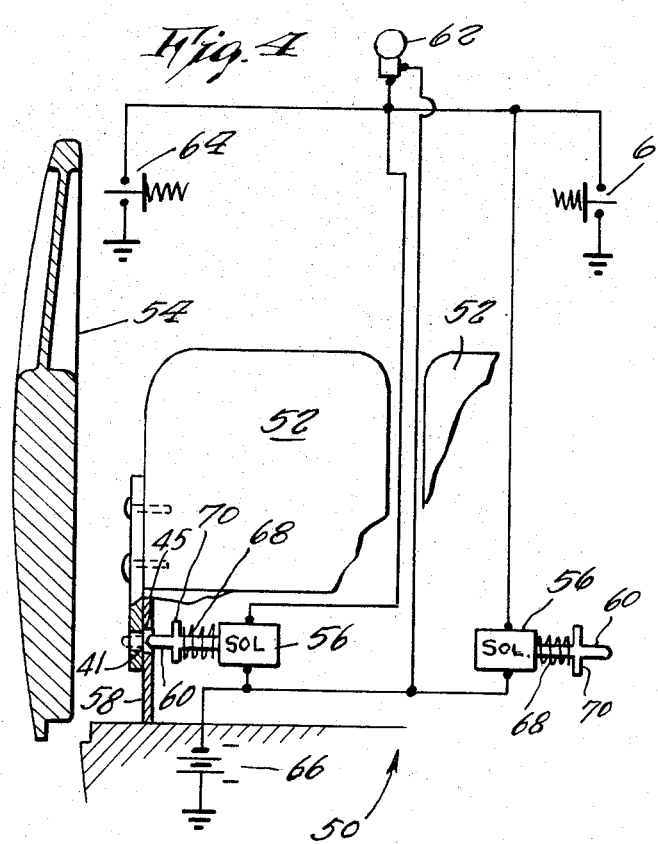
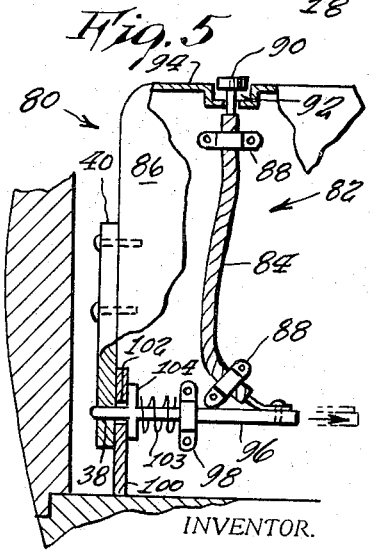
INVENTOR.
ROBERT KARL
BY Jacob L. Kollin
ATTORNEY

United States Patent Office 3,339,976
Patented Sept. 5, 1967

3,339,976
AUTOMOBILE SEAT BACKREST LOCKING DEVICE
Robert Karl, 75—71 185th St., Flushing, N.Y. 11366
Filed May 12, 1966, Ser. No. 549,664
1 Claim. (Cl. 297—379)

ABSTRACT OF THE DISCLOSURE

An angular hinge arm is secured with one end to the side of the frame of a backrest of an automobile seat. The other end of the arm is pivoted to the side of the seat frame and has an opening spaced from the pivot point. A solenoid, having a plunger engageable within the opening in the hinge arm, is mounted on the underside of the seat frame. A compression coil spring biases the plunger in the opening, thus preventing the hinge arm from pivoting. The solenoid retracts the plunger from the opening when energized by the door switch of the vehicle when the door is opened, thus permitting the hinge arm and the backrest to pivot forward.

---

This invention relates generally to two-door passenger automobiles. More specifically it relates to a seat backrest locking device for such automobiles.

It is generally well known that in conventional passenger automobiles having two doors and front and rear seats, it is necessary for a person entering or leaving the vehicle from the rear seat to first pivot forwardly the front seat backrest so as to permit access to the singular doorway on the one side of the car. The reason for this is that the doorway is located forwardly to accommodate principally the front seat occupants. It is further known that in vehicles having this type of construction, the front seat backrest is subject to pivot forwardly during travel, particularly upon hard or sudden braking action. Such situation can be especially objectionable when there are passengers in the rear seat who may be thrown forwardly against the front seat backrest and whose weight can cause the driver or right side front seat passenger to be forced forwardly from the seat. A driver in such position is in danger of not being able to properly control the car making it subject to a possible accident.

Accordingly, it is a principal object of the present invention to provide a means for permitting the front seat backrest to be tilted forwardly at times when the door is open to allow movement of passengers to the rear seat, but which will lock the backrest when the door is closed, such as during time of travel, thus preventing the backrest from being tilted forwardly and endangering the driver's control of the car.

Another object is to provide an automobile seat backrest locking device that is operated automatically by the vehicle door thereby requiring no extra manual attention to be effective.

Another object is to provide an automobile seat backrest locking device that can be incorporated into a vehicle construction during the vehicle manufacture or which can be designed to be readily attachable to already existing vehicles.

Other objects are to provide an automobile seat backrest locking device that is simple in design, inexpensive to manufacture, rugged in construction, easy to install, and efficient in operation.

These and other objects will be readily evident upon a study of the following specification and the accompanying drawing wherein:

FIG. 1 is a side elevation view of an automobile showing the present invention incorporated therein;

FIG. 2 is a rear view of the front seats and backrests as viewed along cross-sectional line 2—2 of FIG. 1 shown in disengaged position;

FIG. 3 is an enlarged fragmentary cross-sectional view thereof shown in engaged position;

FIG. 4 is an electro-mechanical diagram taken in the same plane as FIG. 2 and showing a modified form of the invention; and FIG. 5 is a rear view taken on a plane similar to FIG. 2 and showing a further modified form of the invention wherein the device is manually operated.

Referring now to the drawing in detail, and more particularly to FIGURES 1, 2, and 3, the reference numeral 10 represents an automobile seat backrest locking device according to the present invention, wherein there is a housing 14 mounted upon a bracket 16 which is affixed to the side 18 of a seat frame 20. A horizontally slidable pin 22 is supported in bearings 24 in the side walls 26 of the housing, the pin ends 28 and 30 extending therethrough. A rubber cap 32 is fitted over the end 30 for abutment against a plate 34 secured on the inner side of the automobile door 36. The opposite end 28 of the pin is in alignment with an opening 38 in the backrest hinge arm 40 pivoted on pin 42; the opening 38 being in alignment with the pin 28 only when the backrest 44 is in upright position, as shown by the solid lines in FIG. 1. A compression coil spring 46 within the housing normally bears against a collar 48 affixed on pin 22 to urge the pin into disengagement with opening 38, and into the path of the car door 36.

In operative use, when the door is open, the pin 22 is accordingly not in engagement with the opening 38, thereby permitting the backrest to be tilted forwardly to allow persons to gain access to and from the rear seat of the vehicle. When the door is thereafter closed, the door forces the pin 22 to engage the opening 38, thereby locking the hinge arm to prevent pivoting thereof and the backrest secured thereto.

In a modified construction 50, shown in FIG. 4, the backrests 52 are automatically locked against pivoting by electrical means operated by closing or opening of either side door 54. In this construction, a solenoid 56 is mounted to the underside of each seat frame 58, the solenoid having a plunger 60 which is engageable within opening 41 of the hinge arm 43 and supported in opening 45 while thus engaged. An electrical circuit to each solenoid communicates with the normal electrical circuit to the automobile dome lamp 62 and includes the door operated switches 64 and the car battery 66. In this form of the invention, the door 54, upon closing, depresses switch 64 causing electrical current to the dome lamp to be turned off and at the same time causing current to the solenoid to be also turned off, thereby allowing a compression coil spring 68 bearing against a collar 70 on the plunger 60 to push the plunger into engagement with opening 38 in the hinge arm 40, thus locking the hinge arm and backrest against tilting forwardly.

In a further modified construction 80, shown in FIG. 5, a manually operated mechanism 82 is provided for locking the backrest against tilting. A flexible cable 84, within the interior of backrest 86 is supported in brackets 88 mounted therewithin. A push button 90 at the upper end of the cable is vertically movable within a depression 92 formed in the upper wall 94 of the backrest. The lower end of the flexible cable is connected to a horizontally slidable bolt 96, slidably supported in a bracket 98 mounted within the seat frame 100. One end of the bolt is slidable outward through an opening 102 in the frame and into the opening 38 in the hinge arm 40. A compression coil spring 103 around the bolt is located between the bracket 98 and a collar 104 integrally formed on the bolt, the spring normally urging the bolt into engagement with the opening 38.

In operative use, when a person wishes to gain admittance to the automobile rear seat, he simply depresses the push button, thus causing the bolt to disengage with the hinge arm and free the backrest for tilting forwardly.

In the automatically operative constructions shown, a person needs only to open the door, tilt the backrest forward so as to get the rear seat and then close the door, the backrest now being automatically locked against tilting forwardly. In the manually operative construction, last shown, a person must push the button to free the backrest, and the door is not concerned in the operation.

While various changes may be made in the detail construction, it is understood that such changes will be within the spirit and scope of the present invention as is defined by the appended claim.

I claim:

In an automobile seat backrest locking device, the combination of a projection member and a receptacle member, said projection member being receivable within said receptacle member, one of said members being secured to an automobile front seat backrest, and the other of said members having means for movement, for selective engagement or disengagement of said projection member and said receptacle member, said receptacle member comprising a hinge arm pivotally secured at one end to a seat frame, the other end being fixedly secured to said backrest, and said hinge arm having an opening for receiving said member, said projection member comprising a solenoid secured on said frame, said solenoid having a plunger which is selectively receivable within said hinge arm opening, said solenoid being within an electric circuit comprising a dome light, automobile battery, and door operated switches for energizing the solenoid for retracting said plunger when the door is opened.

References Cited

UNITED STATES PATENTS

| | | | |
|---|---|---|---|
| 1,986,840 | 1/1935 | Meilink | 312—333 X |
| 2,559,548 | 7/1951 | Seigneur | 296—63 |
| 2,624,613 | 1/1953 | Parmely | 296—65 |
| 2,815,796 | 12/1957 | Lobanoff | 296—68 |
| 2,908,530 | 10/1959 | Sanderson | 296—65 |
| 3,028,199 | 4/1962 | Beierbach et al. | 297—379 |
| 3,157,433 | 11/1964 | Davis | 297—379 |

FOREIGN PATENTS 465,893  9/1928  Germany.

DAVID J. WILLIAMOWSKY, *Primary Examiner.*

FRANK B. SHERRY, *Examiner.*

G. O. FINCH, *Assistant Examiner.*